US006988168B2

(12) United States Patent
Rowlands et al.

(10) Patent No.: US 6,988,168 B2
(45) Date of Patent: Jan. 17, 2006

(54) CACHE PROGRAMMABLE TO PARTITION WAYS TO AGENTS AND/OR LOCAL/REMOTE BLOCKS

(75) Inventors: Joseph B. Rowlands, Santa Clara, CA (US); Rohini Krishna Kaza, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 321 days.

(21) Appl. No.: 10/413,917

(22) Filed: Apr. 15, 2003

(65) Prior Publication Data

US 2003/0217229 A1 Nov. 20, 2003

Related U.S. Application Data

(63) Continuation-in-part of application No. 10/270,028, filed on Oct. 11, 2002.

(60) Provisional application No. 60/380,740, filed on May 15, 2002.

(51) Int. Cl.
*G06F 12/00* (2006.01)
(52) U.S. Cl. ............................ 711/129; 711/128; 365/49
(58) Field of Classification Search ........ 711/127–130, 711/143–148, 170–173; 365/49; 712/203; 710/45
See application file for complete search history.

(56) References Cited

U.S. PATENT DOCUMENTS

| | | | |
|---|---|---|---|
| 3,693,165 A | 9/1972 | Reiley et al. ............... 711/207 |
| 4,044,338 A | 8/1977 | Wolf ............................ 365/49 |
| 4,371,929 A * | 2/1983 | Brann et al. ................. 710/45 |
| 4,453,212 A | 6/1984 | Gaither et al. ............... 711/2 |
| 4,511,994 A | 4/1985 | Webb et al. ................. 711/160 |
| 4,575,792 A | 3/1986 | Keeley ......................... 714/42 |
| 4,633,440 A | 12/1986 | Pakulski ................. 365/189.05 |
| 4,654,778 A | 3/1987 | Chiesa et al. ............... 711/151 |
| 4,807,115 A | 2/1989 | Torng ......................... 712/215 |
| 4,833,642 A | 5/1989 | Ooi ............................. 365/49 |
| 4,858,105 A | 8/1989 | Kuriyama et al. .......... 712/235 |
| 4,907,278 A | 3/1990 | Cacinati et al. ............. 704/246 |
| 4,996,641 A | 2/1991 | Talgam et al. .............. 711/118 |
| 5,113,514 A | 5/1992 | Albonesi et al. |
| 5,125,083 A | 6/1992 | Fite et al. ................... 712/207 |

(Continued)

FOREIGN PATENT DOCUMENTS

EP  0 061 570  10/1982

(Continued)

OTHER PUBLICATIONS

Dekker et al., "A Realistic Fault Model and Test Algorithms for Static Random Access Memories," IEEE Transactions on Computer-Aided Design, vol. 9, No. 6, Jun. 1990, pp. 567-572.

(Continued)

*Primary Examiner*—Nasser Moazzami
(74) *Attorney, Agent, or Firm*—Garlick Harrison & Markison LLP (57) ABSTRACT

A cache comprises a memory including a plurality of entries and a circuit. Each entry of the plurality of entries is configured to store a cache block. The circuit is configured to select a first entry of the plurality of entries to store a first cache block. In one implementation, the first cache block corresponds to a first transaction initiated by a first agent, wherein the first entry is selected from a first subset of the plurality of entries indicated as selectable for the first agent. In another implementation, the circuit is configured to select the first entry of the plurality of entries in response to whether the first cache block is a remote cache block or a local cache block. In other implementations, the circuit may be configured to handle a combination of the above.

9 Claims, 6 Drawing Sheets

U.S. PATENT DOCUMENTS

| | | | | |
|---|---|---|---|---|
| 5,163,142 A | 11/1992 | Mageau | ............... | 711/142 |
| 5,193,163 A | 3/1993 | Sanders et al. | ............... | 711/122 |
| 5,226,126 A | 7/1993 | McFarland et al. | ............... | 712/218 |
| 5,226,130 A | 7/1993 | Favor et al. | ............... | 712/238 |
| 5,241,663 A | 8/1993 | Rohwer | ............... | 711/172 |
| 5,303,362 A | 4/1994 | Butts, Jr. et al. | | |
| 5,317,716 A | 5/1994 | Liu | ............... | 711/144 |
| 5,325,504 A | 6/1994 | Tipley et al. | ............... | 711/128 |
| 5,353,425 A | 10/1994 | Malamy et al. | ............... | 711/144 |
| 5,369,753 A | 11/1994 | Tipley | ............... | 711/122 |
| 5,377,345 A | 12/1994 | Chang et al. | ............... | 711/118 |
| 5,410,669 A | 4/1995 | Biggs et al. | ............... | 711/118 |
| 5,416,783 A | 5/1995 | Broseghini et al. | ............... | 714/728 |
| 5,432,918 A | 7/1995 | Stamm | ............... | 711/156 |
| 5,450,551 A | 9/1995 | Amini et al. | ............... | 710/119 |
| 5,471,598 A | 11/1995 | Quattromani et al. | ............... | 711/122 |
| 5,487,162 A | 1/1996 | Tanaka et al. | ............... | 711/145 |
| 5,493,667 A | 2/1996 | Huck et al. | ............... | 711/125 |
| 5,510,934 A | 4/1996 | Brennan et al. | ............... | 711/119 |
| 5,526,510 A | 6/1996 | Akkary et al. | ............... | 711/133 |
| 5,539,878 A | 7/1996 | Kikinis | ............... | 714/30 |
| 5,551,001 A | 8/1996 | Cohen et al. | ............... | 711/122 |
| 5,557,763 A | 9/1996 | Senter et al. | ............... | 712/23 |
| 5,564,034 A | 10/1996 | Miyake | ............... | 711/128 |
| 5,584,014 A | 12/1996 | Nayfeh et al. | ............... | 711/134 |
| 5,586,253 A | 12/1996 | Green et al. | ............... | 714/53 |
| 5,588,126 A | 12/1996 | Abramson et al. | ............... | 712/200 |
| 5,592,679 A | 1/1997 | Yung | ............... | 712/23 |
| 5,638,537 A | 6/1997 | Yamada et al. | ............... | 711/167 |
| 5,644,752 A | 7/1997 | Cohen et al. | ............... | 711/122 |
| 5,668,815 A | 9/1997 | Gittinger et al. | ............... | 714/719 |
| 5,668,972 A | 9/1997 | Liu et al. | ............... | 711/136 |
| 5,671,444 A | 9/1997 | Akkary et al. | ............... | 701/29 |
| 5,748,640 A | 5/1998 | Jiang et al. | ............... | 714/720 |
| 5,752,261 A | 5/1998 | Cochcroft, Jr. | ............... | 711/133 |
| 5,761,712 A | 6/1998 | Tran et al. | ............... | 711/126 |
| 5,768,555 A | 6/1998 | Tran et al. | ............... | 712/216 |
| 5,778,429 A * | 7/1998 | Sukegawa et al. | ............... | 711/129 |
| 5,784,588 A | 7/1998 | Leung | ............... | 712/216 |
| 5,787,490 A | 7/1998 | Ozawa | ............... | 711/173 |
| 5,802,338 A | 9/1998 | Rechtschaffen et al. | ............... | 712/217 |
| 5,809,528 A | 9/1998 | Miller et al. | ............... | 711/136 |
| 5,809,531 A | 9/1998 | Brabandt | ............... | 711/141 |
| 5,875,465 A | 2/1999 | Kilpatrick et al. | ............... | 711/134 |
| 5,897,651 A | 4/1999 | Cheong et al. | ............... | 711/3 |
| 5,898,849 A * | 4/1999 | Tran | ............... | 712/203 |
| 5,913,224 A | 6/1999 | MacDonald | ............... | 711/125 |
| 5,937,431 A * | 8/1999 | Kong et al. | ............... | 711/145 |
| 5,974,507 A | 10/1999 | Arimilli et al. | ............... | 711/133 |
| 5,974,508 A | 10/1999 | Maheshwari | ............... | 711/133 |
| 5,983,321 A | 11/1999 | Tran et al. | ............... | 711/125 |
| 6,026,461 A | 2/2000 | Baxter et al. | | |
| 6,115,792 A | 9/2000 | Tran | ............... | 711/128 |
| 6,148,370 A | 11/2000 | Kobayashi | ............... | 711/118 |
| 6,161,167 A | 12/2000 | Witt | ............... | 711/136 |
| 6,185,657 B1 | 2/2001 | Moyer | ............... | 711/128 |
| 6,185,703 B1 | 2/2001 | Guddat et al. | ............... | 714/718 |
| 6,240,432 B1 | 5/2001 | Chuang et al. | ............... | 708/252 |
| 6,240,532 B1 | 5/2001 | Cho | ............... | 714/42 |
| 6,263,082 B1 | 7/2001 | Ishimoto et al. | ............... | 380/46 |
| 6,266,743 B1 * | 7/2001 | Carpenter et al. | ............... | 711/143 |
| 6,269,427 B1 | 7/2001 | Kuttanna et al. | ............... | 711/140 |
| 6,279,083 B1 | 8/2001 | MacDonald | ............... | 711/138 |
| 6,295,584 B1 * | 9/2001 | DeSota et al. | ............... | 711/147 |
| 6,295,608 B1 | 9/2001 | Parkes et al. | ............... | 714/1 |
| 6,351,789 B1 | 2/2002 | Green | ............... | 711/128 |
| 6,405,287 B1 | 6/2002 | Lesartre | ............... | 711/128 |
| 6,430,655 B1 | 8/2002 | Courtright et al. | ............... | 711/118 |
| 6,519,690 B1 * | 2/2003 | Quimby | ............... | 711/202 |

FOREIGN PATENT DOCUMENTS

| | | |
|---|---|---|
| EP | 0 259 095 | 3/1988 |
| EP | 325 420 | 7/1989 |
| EP | 0 381 471 | 8/1990 |
| EP | 0 436 092 | 7/1991 |
| EP | 0 459 232 | 12/1991 |
| EP | 0 459 233 | 12/1991 |
| EP | 569 221 | 11/1993 |
| EP | 0 687 979 | 12/1995 |
| EP | 997 821 | 5/2000 |
| EP | 03010901.1 | 9/2003 |
| GB | 2 214 336 | 8/1989 |
| GB | 2 263 985 | 8/1993 |
| GB | 2 263 987 | 8/1993 |
| GB | 2 281 422 | 3/1995 |

OTHER PUBLICATIONS

Stepanian, SiByte, SiByte SB-1 MIPS64 CPU Core, Embedded Processor Forum 2000, Jun. 13, 2000, 15 pages.

Halfhill et al., "SiByte Reveals 64-bit Core for NPUs," Microprocessor Report, Jun. 2000, pp. 45-48.

*Intel® StrongARM® SA-1100 Microprocessor, Developer's Manual*, Aug. 1999, © Intel Corporation, Ch. 1, p. 6; Ch. 2, p. 2; Ch. 6, pp. 2-5; Ch. 7, p. 3.

Cyrix® 5x86 Microprocessor, Jul. 1995, 8 pgs.

Cyrix® 6x86 Microprocessor, Aug. 1995, 6 pgs.

"Memory Arbitration with Out of Order Execution in Conjunction with a RISC System," IBM Technical Disclosure Bulletin, Sep. 1992, pp. 62-64.

"Handling Reservations in Multiple-Level Cache," IBM Technical Disclosure Bulletin, Dec. 1993, pp. 441-446.

Hollenbeck, et al., "PA3700LC Integrates Cache for Cost/Performance," Hewlett Packard Company, IEEE, 1996, pp. 167-174.

Gallup, et al., "Testability Features of the 68040," Motorola, Inc., 1990 International Test Conference, IEEE, pp. 749-757.

* cited by examiner

CACHE PROGRAMMABLE TO PARTITION WAYS TO AGENTS AND/OR LOCAL/REMOTE BLOCKS

This application claims benefit of priority to U.S. Provisional Patent Application Ser. No. 60/380,740, filed May 15, 2002. This application is a continuation in part of U.S. patent application Ser. No. 10/270,028, filed on Oct. 11, 2002.

BACKGROUND OF THE INVENTION

1. Field of the Invention

This invention is related to the field of caches and, more particularly, to replacement mechanisms in caches.

2. Description of the Related Art

Processors typically provide a set of registers which may be used by programs as a high speed, private storage for operands. The operands stored in registers may be frequently accessed variables, or may be intermediate results in a complex, multi-instruction calculation. Unfortunately, for many tasks, the number of registers provided in the processor may be too few to hold all of the operands of interest. In such cases, many of the frequently accessed variables and/or intermediate results are written to and read from memory locations during execution of the program.

The memory may have a significantly higher latency than the registers, limiting the speed at which the program may be executed as compared to the speed that may be achieved if all operands were in registers. Processors and/or the computer systems including the processors may provide caches to alleviate the memory latency. Generally, a cache is a relatively small, high speed memory which may store copies of data corresponding to various recently-accessed memory locations. Generally, cache storage is allocated and deallocated in units of cache blocks (a group of bytes from contiguous memory locations). In other words, the cache may include multiple entries, and each entry may include storage for a cache block of bytes. If requested data for an access is not in the cache (a "miss"), an entry is allocated for the cache block including the requested data and the cache block is filled into the allocated entry.

Caches are a finite resource, and thus may be susceptible to "cache thrashing" or "cache pollution" effects. These effects generally refer to frequently replacing the same data in the cache due to the access patterns to the cache. For example, if the amount of data being accessed by a given process exceeds the size of the cache (or maps to a subset of the cache that is smaller, in size, than the amount of data), accessing a first portion of the data may cause a second portion to be replaced in the cache. Subsequently accessing the second portion may cause the first portion to be replaced, and so on.

If multiple processors (executing different processes) access a given cache, then cache blocks accessed by one processor may cause cache blocks accessed by another processor to be replaced. Both processors may be accessing data sets that might otherwise remain in the cache, but the interference between the processors may cause the amount of data retained in cache to be less than optimal.

In some systems, multiple nodes (each including processors and caches) may form a distributed memory system. Memory attached to a given node may be local to that node, while memory attached to other nodes may be remote to the given node. Latency for accessing remote memory in the given node may be higher than accessing the local memory, in general, due to the communication needed with the other nodes (e.g. cache-coherent nonuniform memory access (CC-NUMA) systems may be employed). If data from the remote memory is cached in the cache, that data is subject to replacement by local data that is subsequently accessed. If the remote data is subsequently accessed again in the node, the higher latency to access the remote memory may be experienced.

SUMMARY OF THE INVENTION

In one implementation, a cache comprises a memory including a plurality of entries and a circuit. Each entry of the plurality of entries is configured to store a cache block. The circuit is configured to select a first entry of the plurality of entries to store a first cache block corresponding to a first transaction initiated by a first agent, wherein the first entry is selected from a first subset of the plurality of entries indicated as selectable for the first agent.

In another implementation, a cache comprises the memory and the circuit. The circuit is configured to select a first entry of the plurality of entries to store a first cache block, wherein the first entry is selected in response to whether the first cache block is a remote cache block or a local cache block. A local cache block has a first home node that includes the cache, while a remote cache block has a second home node other than the first home node. In other implementations, the circuit may be configured to handle a combination of the subset indicated as selectable for the first agent and selecting an entry based on whether the cache block is local or remote.

BRIEF DESCRIPTION OF THE DRAWINGS

The following detailed description makes reference to the accompanying drawings, which are now briefly described.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Node Overview

Figure 1:
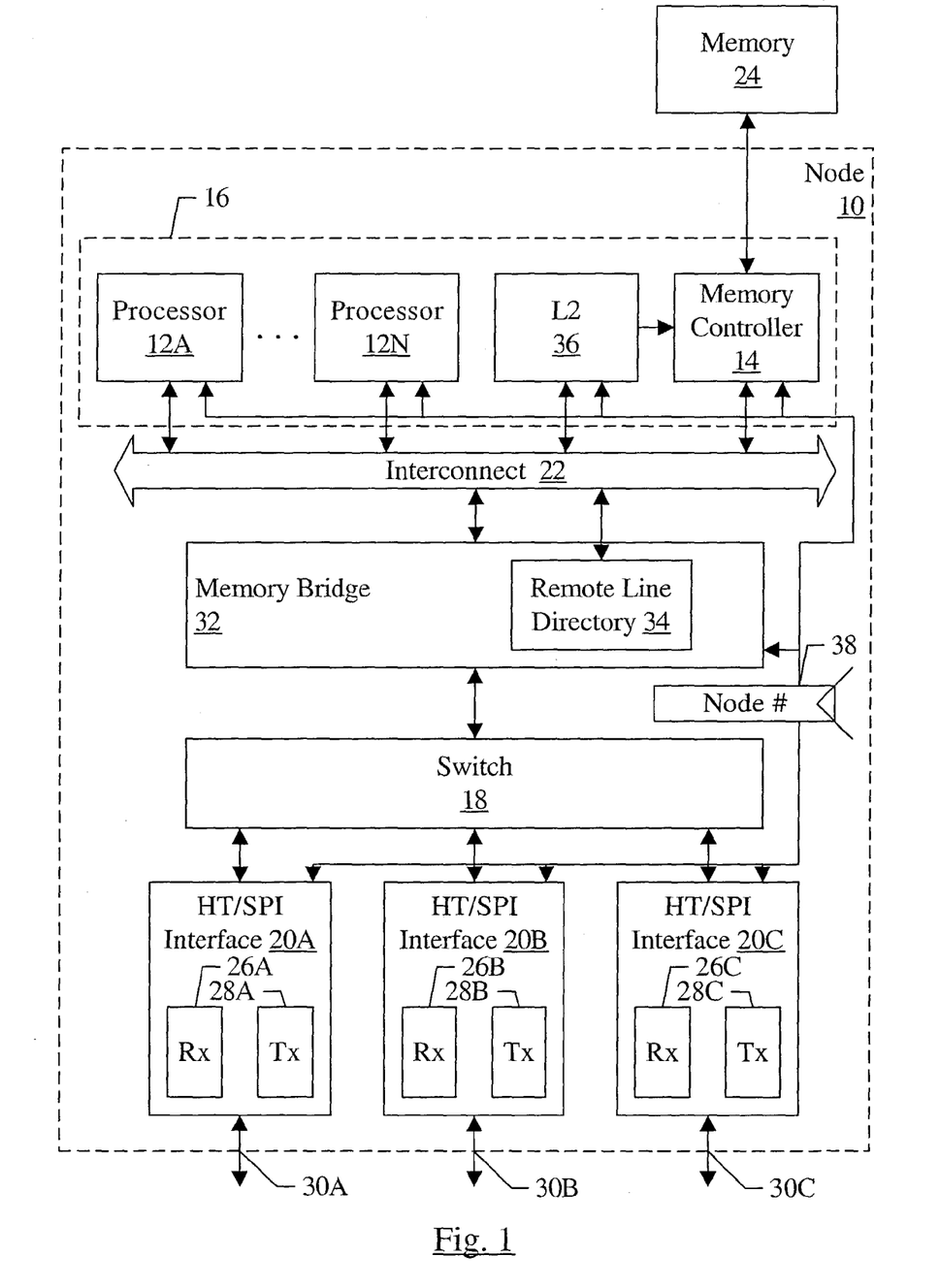
FIG. 1 is a block diagram of one embodiment of a node including a cache.

Turning now to FIG. 1, a block diagram of one embodiment of a node 10 is shown. In the embodiment of FIG. 1, the node 10 includes one or more processors 12A–12N, a memory controller 14, a switch 18, a set of interface circuits 20A–20C, a memory bridge 32, and an L2 cache 36. The memory bridge 32 includes a remote line directory 34. The node 10 includes an interconnect 22 to which the processors 12A–12N, the memory controller 14, the L2 cache 36, the memory bridge 32, and the remote line directory 34 are coupled. The node 10 is coupled, through the memory controller 14, to a memory 24. The interface circuits 20A–20C each include a receive (Rx) circuit 26A–26C and a transmit (Tx) circuit 28A–28C. The node 10 is coupled to a set of interfaces 30A–30C through respective interface circuits 20A–20C. The interface circuits 20A–20C are coupled to the switch 18, which is further coupled to the memory bridge 32. A configuration register 38 is also illustrated in FIG. 1, which stores a node number (Node #) for the node 10. The configuration register 38 is coupled to the L2 cache 36, the memory controller 14, the memory bridge 32, and the interface circuits 20A–20C in the embodiment of FIG. 1. Additionally, the processors 12A–12N may be coupled to receive the node number from the configuration register 38.

The node 10 may support intranode coherency for transactions on the interconnect 22. Additionally, the node 10 may support internode coherency with other nodes (e.g. a CC-NUMA coherency, in one embodiment). Generally, as used herein, a memory bridge includes circuitry designed to handle internode coherency functions within a node. Particularly, in one embodiment, if a transaction on the interconnect 22 (e.g. a transaction issued by the processors 12A–12N) accesses a cache block that is remote to the node 10 (i.e. the cache block is part of the memory coupled to a different node) and the node 10 does not have sufficient ownership to perform the transaction, the memory bridge 32 may issue one or more coherency commands to the other nodes to obtain the ownership (and a copy of the cache block, in some cases). Similarly, if the transaction access a local cache block but one or more other nodes have a copy of the cache block, the memory bridge 32 may issue coherency commands to other nodes. Still further, the memory bridge 32 may receive coherency commands from other nodes, and may perform transactions on the interconnect 22 to effect the coherency commands.

In one embodiment, a node such as node 10 may have memory coupled thereto (e.g. memory 24). The node may be responsible for tracking the state, in other nodes, of each cache block from the memory in that node. A node is referred to as the "home node" for cache blocks from the memory assigned to that node. A node is referred to as a "remote node" for a cache block if the node is not the home node for that cache block. Similarly, a cache block is referred to as a local cache block in the home node for that cache block and as a remote cache block in other nodes.

Generally, a remote node may begin the coherency process by requesting a copy of a cache block from the home node of that cache block using a coherency command. The memory bridge 32 in the remote node, for example, may detect a transaction on the interconnect 22 that accesses the cache block and may detect that the remote node does not have sufficient ownership of the cache block to complete the transaction (e.g. it may not have a copy of the cache block at all, or may have a shared copy and may require exclusive ownership to complete the transaction). The memory bridge 32 in the remote node may generate and transmit the coherency command to the home node to obtain the copy or to obtain sufficient ownership. The memory bridge 32 in the home node may determine if any state changes in other nodes are to be performed to grant the requested ownership to the remote node, and may transmit coherency commands (e.g. probe commands) to effect the state changes. The memory bridge 32 in each node receiving the probe commands may effect the state changes and respond to the probe commands. Once the responses have been received, the memory bridge 32 in the home node may respond to the remote node (e.g. with a fill command including the cache block).

The remote line directory 34 may be used in the home node to track the state of the local cache blocks in the remote nodes. The remote line directory 34 is updated each time a cache block is transmitted to a remote node, the remote node returns the cache block to the home node, or the cache block is invalidated via probes. As used herein, the "state" of a cache block in a given node refers to an indication of the ownership that the given node has for the cache block according to the coherency protocol implemented by the nodes. Certain levels of ownership may permit no access, read-only access, or read-write access to the cache block. For example, in one embodiment, the modified, shared, and invalid states are supported in the internode coherency protocol. In the modified state, the node may read and write the cache block and the node is responsible for returning the block to the home node if evicted from the node. In the shared state, the node may read the cache block but not write the cache block without transmitting a coherency command to the home node to obtain modified state for the cache block. In the invalid state, the node may not read or write the cache block (i.e. the node does not have a valid copy of the cache block). Other embodiments may use other coherency protocols (e.g. the MESI protocol, which includes the modified, shared, and invalid states and an exclusive state in which the cache block has not yet been updated but the node is permitted to read and write the cache block, or the MOESI protocol which includes the modified, exclusive, shared, and invalid states and an owned state which indicates that there may be shared copies of the block but the copy in main memory is stale). In one embodiment, agents within the node may implement the MESI protocol for intranode coherency. Thus, the node may be viewed as having a state in the internode coherency and individual agents may have a state in the intranode coherency (consistent with the internode coherency state for the node containing the agent).

Coherency commands are transmitted and received on one of the interfaces 30A–30C by the corresponding interface circuit 20A–20C. The interface circuits 20A–20C receive coherency commands for transmission from the memory bridge 32 and transmit coherency commands received from the interfaces 30A–30C to the memory bridge 32 for processing, if the coherency commands require processing in the node 10. In some embodiments, a coherency command may be received that is passing through the node 10 to another node, and does not require processing in the node 10. The interface circuits 20A–20C may be configured to detect such commands and retransmit them (through another interface circuit 20A–20C) without involving the memory bridge 32.

In the illustrated embodiment, the interface circuits 20A–20C are coupled to the memory bridge 32 through the switch 18 (although in other embodiments, the interface circuits 20A–20C may have direct paths to the memory bridge 32). The switch 18 may selectively couple the interface circuits 20A–20C (and particularly the Rx circuits 26A–26C in the illustrated embodiment) to other interface circuits 20A–20C (and particularly the Tx circuits 28A–28C in the illustrated embodiment) or to the memory bridge 32 to transfer received coherency commands. The switch 18 may also selectively couple the memory bridge 32 to the interface circuits 20A–20C (and particularly to the Tx circuits 28A–28C in the illustrated embodiment) to transfer coherency commands generated by the memory bridge 32 from the memory bridge 32 to the interface circuits 20A–20C for transmission on the corresponding interface 30A–30C. The switch 18 may have request/grant interfaces to each of the interface circuits 20A–20C and the memory bridge 32 for requesting transfers and granting those transfers. The switch 18 may have an input path from each source (the Rx circuits 26A–26C and the memory bridge 32) and an output path to each destination (the Tx circuits 28A–28C and the memory bridge 32), and may couple a granted input path to a granted output path for transmission of a coherency command (or a portion thereof, if coherency commands are larger than one transfer through the switch 18). The couplings may then be changed to the next granted input path and granted output path. Multiple independent input path/output path grants may occur concurrently.

In one embodiment, the interfaces 30A–30C may support a set of virtual channels in which commands are transmitted. Each virtual channel is defined to flow independent of the other virtual channels, even though the virtual channels may share certain physical resources (e.g. the interface 30A–30C on which the commands are flowing). These virtual channels may be mapped to internal virtual channels (referred to as switch virtual channels herein). The switch 18 may be virtual-channel aware. That is, the switch 18 may grant a coupling between a source and a destination based not only on the ability of the source to transfer data and the destination to receive data, but also on the ability of the source to transfer data in a particular switch virtual channel and the destination to receive data on that switch virtual channel. Thus, requests from sources may indicate the destination and the virtual channel on which data is to be transferred, and requests from destinations may indicate the virtual channel on which data may be received.

Generally speaking, a node may include one or more coherent agents (dotted enclosure 16 in FIG. 1). In the embodiment of FIG. 1, the processors 12A–12N, the L2 cache 36, and the memory controller 14 may be examples of coherent agents 16. Additionally, the memory bridge 32 may be a coherent agent (on behalf of other nodes). However, other embodiments may include other coherent agents as well, such as a bridge to one or more I/O interface circuits, or the I/O interface circuits themselves. Generally, an agent includes any circuit which participates in transactions on an interconnect. A coherent agent is an agent that is capable of performing coherent transactions and operating in a coherent fashion with regard to transactions. A transaction is a communication on an interconnect. The transaction is sourced by one agent on the interconnect, and may have one or more agents as a target of the transaction. Read transactions specify a transfer of data from a target to the source, while write transactions specify a transfer of data from the source to the target. Other transactions may be used to communicate between agents without transfer of data, in some embodiments.

Each of the interface circuits 20A–20C are configured to receive and transmit on the respective interfaces 30A–30C to which they are connected. The Rx circuits 26A–26C handle the receiving of communications from the interfaces 30A–30C, and the Tx circuits 28A–28C handle the transmitting of communications on the interfaces 30A–30C.

Each of the interfaces 30A–30C used for coherent communications are defined to be capable of transmitting and receiving coherency commands. Particularly, in the embodiment of FIG. 1, those interfaces 30A–30C may be defined to receive/transmit coherency commands to and from the node 10 from other nodes. Additionally, other types of commands may be carried. In one embodiment, each interface 30A–30C may be a HyperTransport™ (HT) interface, including an extension to the HT interface to include coherency commands (HTcc). Additionally, in some embodiments, an extension to the HyperTransport interface to carry packet data (Packet over HyperTransport, or PoHT) may be supported. As used herein, coherency commands include any communications between nodes that are used to maintain coherency between nodes. The commands may include read or write requests initiated by a node to fetch or update a cache block belonging to another node, probes to invalidate cached copies of cache blocks in remote nodes (and possibly to return a modified copy of the cache block to the home node), responses to probe commands, fills which transfer data, etc.

In some embodiments, one or more of the interface circuits 20A–20C may not be used for coherency management and may be defined as packet interfaces. Such interfaces 30A–30C may be HT interfaces. Alternative, such interfaces 30A–30C may be system packet interfaces (SPI) according to any level of the SPI specification set forth by the Optical Internetworking Forum (e.g. level 3, level 4, or level 5). In one particular embodiment, the interfaces may be SPI-4 phase 2 interfaces. In the illustrated embodiment, each interface circuit 20A–20C may be configurable to communicate on either the SPI-4 interface or the HT interface. Each interface circuit 20A–20C may be individually programmable, permitting various combinations of the HT and SPI-4 interfaces as interfaces 30A–30C. The programming may be performed in any fashion (e.g. sampling certain signals during reset, shifting values into configuration registers (not shown) during reset, programming the interfaces with configuration space commands after reset, pins that are tied up or down externally to indicate the desired programming, etc.). Other embodiments may employ any interface capable of carrying packet data (e.g. the Media Independent Interface (MII) or the Gigabit MII (GMII) interfaces, X.25, Frame Relay, Asynchronous Transfer Mode (ATM), etc.). The packet interfaces may carry packet data directly (e.g. transmitting the packet data with various control information indicating the start of packet, end of packet, etc.) or indirectly (e.g. transmitting the packet data as a payload of a command, such as PoHT).

In embodiments which also support packet traffic, the node 10 may also include a packet direct memory access (DMA) circuit configured to transfer packets to and from the memory 24 on behalf of the interface circuits 20A–20C. The switch 18 may be used to transmit packet data from the interface circuits 20A–20C to the packet DMA circuit and from the packet DMA circuit to the interface circuits 20A–20C. Additionally, packets may be routed from an Rx circuit 26A–26C to a Tx circuit 28A–28C through the switch 18, in some embodiments.

The processors 12A–12N may be designed to any instruction set architecture, and may execute programs written to that instruction set architecture. Exemplary instruction set architectures may include the MIPS instruction set architecture (including the MIPS-3D and MIPS MDMX application specific extensions), the IA-32 or IA-64 instruction set architectures developed by Intel Corp., the PowerPC instruction set architecture, the Alpha instruction set architecture, the ARM instruction set architecture, or any other instruction set architecture. The node 10 may include any number of processors (e.g. as few as one processor, two processors, four processors, etc.).

The L2 cache 36 may be any type and capacity of cache memory, employing any organization (e.g. set associative, direct mapped, fully associative, etc.). In one embodiment, the L2 cache 36 may be an 8 way, set associative, 1 MB cache. The L2 cache 36 is referred to as L2 herein because the processors 12A–12N may include internal (L1) caches. In other embodiments the L2 cache 36 may be an L1 cache, an L3 cache, or any other level as desired.

The memory controller 14 is configured to access the memory 24 in response to read and write transactions received on the interconnect 22. The memory controller 14 may receive a hit signal from the L2 cache, and if a hit is detected in the L2 cache for a given read/write transaction, the memory controller 14 may not respond to that transaction. The memory controller 14 may be designed to access any of a variety of types of memory. For example, the memory controller 14 may be designed for synchronous dynamic random access memory (SDRAM), and more particularly double data rate (DDR) SDRAM. Alternatively, the memory controller 16 may be designed for DRAM, DDR synchronous graphics RAM (SGRAM), DDR fast cycle RAM (FCRAM), DDR-II SDRAM, Rambus DRAM (RDRAM), SRAM, or any other suitable memory device or combinations of the above mentioned memory devices.

The interconnect 22 may be any form of communication medium between the devices coupled to the interconnect. For example, in various embodiments, the interconnect 22 may include shared buses, crossbar connections, point-to-point connections in a ring, star, or any other topology, meshes, cubes, etc. The interconnect 22 may also include storage, in some embodiments. In one particular embodiment, the interconnect 22 may comprise a bus. The bus may be a split transaction bus, in one embodiment (i.e. having separate address and data phases). The data phases of various transactions on the bus may proceed out of order with the address phases. The bus may also support coherency and thus may include a response phase to transmit coherency response information. The bus may employ a distributed arbitration scheme, in one embodiment. In one embodiment, the bus may be pipelined. The bus may employ any suitable signaling technique. For example, in one embodiment, differential signaling may be used for high speed signal transmission. Other embodiments may employ any other signaling technique (e.g. TTL, CMOS, GTL, HSTL, etc.). Other embodiments may employ non-split transaction buses arbitrated with a single arbitration for address and data and/or a split transaction bus in which the data bus is not explicitly arbitrated. Either a central arbitration scheme or a distributed arbitration scheme may be used, according to design choice. Furthermore, the bus may not be pipelined, if desired.

Various embodiments of the node 10 may include additional circuitry, not shown in FIG. 1. For example, the node 10 may include various I/O devices and/or interfaces. Exemplary I/O may include one or more PCI interfaces, one or more serial interfaces, Personal Computer Memory Card International Association (PCMCIA) interfaces, etc. Such interfaces may be directly coupled to the interconnect 22 or may be coupled through one or more I/O bridge circuits.

In one embodiment, the node 10 (and more particularly the processors 12A–12N, the memory controller 14, the L2 cache 36, the interface circuits 20A–20C, the memory bridge 32 including the remote line directory 34, the switch 18, the configuration register 38, and the interconnect 22) may be integrated onto a single integrated circuit as a system on a chip configuration. The additional circuitry mentioned above may also be integrated. Alternatively, other embodiments may implement one or more of the devices as separate integrated circuits. In another configuration, the memory 24 may be integrated as well. Alternatively, one or more of the components may be implemented as separate integrated circuits, or all components may be separate integrated circuits, as desired. Any level of integration may be used.

It is noted that, while three interface circuits 20A–20C are illustrated in FIG. 1, one or more interface circuits may be implemented in various embodiments. As used herein, an interface circuit includes any circuitry configured to communicate on an interface according to the protocol defined for the interface. The interface circuit may include receive circuitry configured to receive communications on the interface and transmit the received communications to other circuitry internal to the system that includes the interface circuit. The interface circuit may also include transmit circuitry configured to receive communications from the other circuitry internal to the system and configured to transmit the communications on the interface.

L2 Cache

The L2 cache 36 may be shared among the agents in the node 10 (e.g. the processors 12A–12N and other agents, not shown), caching cache blocks accessed by the agents. Additionally, the L2 cache 36 may store remote cache blocks transferred into the node 10 in response to transactions to the remote cache blocks by the agents. In one embodiment, the L2 cache 36 may retain the state of the remote cache blocks within the node 10. Other agents in the node 10 may have the block in various states that are consistent with the node state maintained in the L2 cache 36.

The L2 cache 36 may be programmable to be partitioned among the various agents. That is, the L2 cache 36 may be programmable with indications of various subsets of the L2 cache that may be used for various agents. Cache blocks accessed by a given agent may be stored into the subset of the L2 cache 36 assigned to that agent. In particular, in one embodiment, the L2 cache 36 may implement a replacement algorithm used when a cache miss occurs, to select a cache entry in the L2 cache 36 to store the missing cache block. The replacement algorithm may be programmable to cause a cache block that misses in the L2 cache 36 to be stored in the subset of the cache entries that are assigned to the agent that initiated the transaction to that cache block. In this fashion, cache blocks accessed by one agent may not cause the cache blocks accessed by another agent to be evicted from the L2 cache 36. Cache pollution/thrashing effects due to interference between cache accesses by different agents may be mitigated, in some embodiments.

The L2 cache 36 may be programmable to be partitioned between remote and local cache blocks. That is, the L2 cache 36 may be programmable with indications of a first subset of the L2 cache 36 to be used to store remote cache blocks and a second subset to be used to store local cache blocks. In a manner similar to the embodiment described above for agent partitioning, the L2 cache 36 may implement a replacement algorithm that causes a missing cache block to be stored in either the local or remote subset, depending on whether the missing cache block is local or remote. The replacement of remote cache blocks (which may have higher latencies for retrieval from the remote memory, as compared to local memory) by local cache blocks may thus be preventable.

The mechanisms for partitioning the L2 cache 36 into subsets on an agent basis and on a local versus remote basis may be used in combination, in some embodiments. Other embodiments are contemplated in which only the partitioning on an agent basis is implemented, or only the partitioning on a local versus remote basis is implemented. In some embodiments, the various subsets assigned to agents (or to remote versus local cache blocks) may overlap. That is, a cache entry may be included in more than one of the subsets.

It is noted that the above described embodiments control the replacement of cache blocks in the L2 cache 36. In such embodiments, a transaction may be detected as hitting in any cache entry in the L2 cache 36. That is, a hit may be detected in a cache entry independent of which agent initiated the transaction and independent of whether the transaction is to a local cache block or remote cache block.

FIGS. 2–6 illustrate a set associative embodiment of the L2 cache 36 in which each way of the set associative cache may be included or excluded in various subsets by programming configuration registers in the L2 cache 36. That is, the cache entries included in the way may be included or excluded from a subset as a group. The description below may describe enabling or disabling ways for an agent, local cache block, or remote cache block. If a way is enabled for the agent, local cache block, or remote cache block, then the way is included in the subset of cache entries that are selectable in response to a cache miss for that agent, local cache block, or remote cache block. If a way is disabled for an agent, local cache block, or remote cache block, then the way is excluded from the subset. Other embodiments may implement a fully associative L2 cache 36, in which each cache entry may be included or excluded from a subset individually. Alternatively, fully associative embodiments may group cache entries for purposes of programming which subsets the cache entries are used in, but may operate in a fully associative configuration otherwise.

Figure 2:
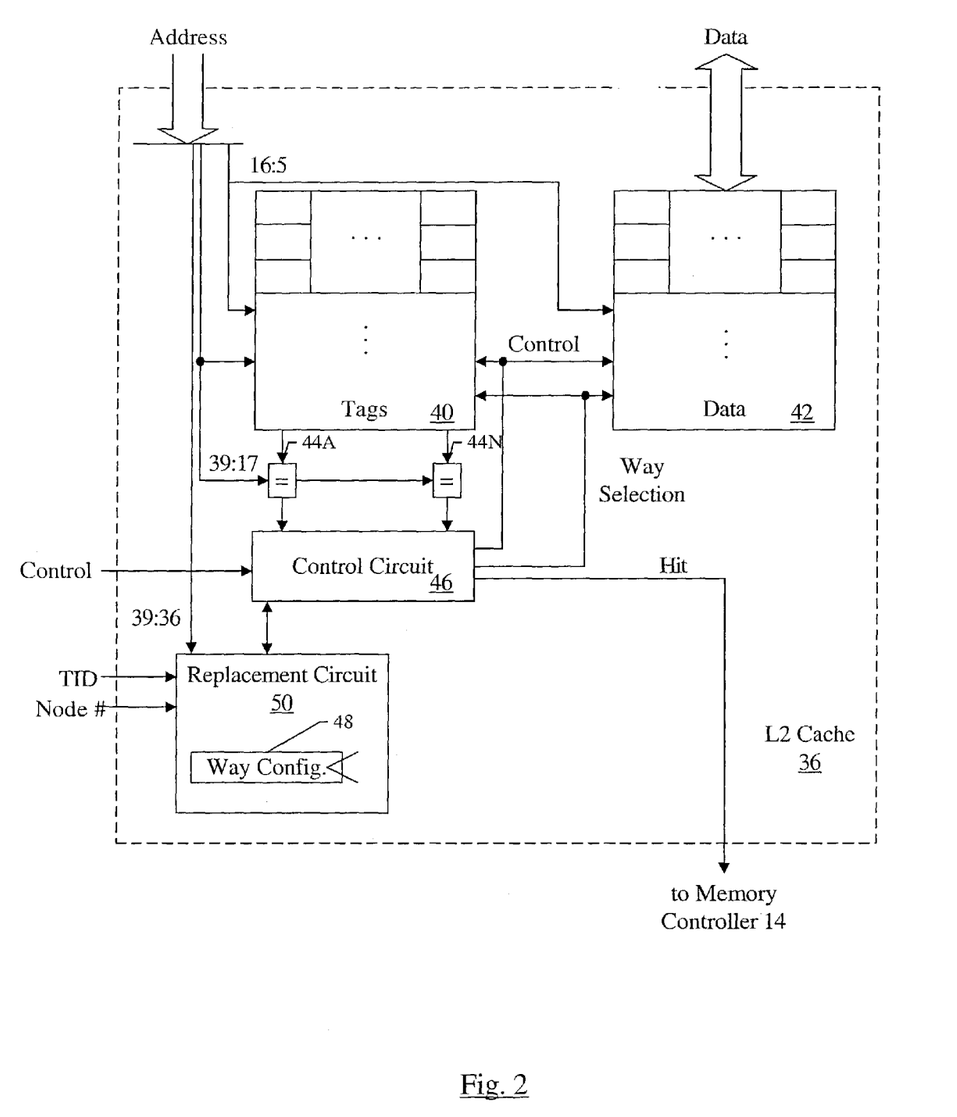
FIG. 2 is a block diagram of one embodiment of the cache shown in FIG. 1.

Turning now to FIG. 2, a block diagram of one embodiment of the L2 cache 36 is shown. In the embodiment of FIG. 2, the L2 cache 36 includes a tags memory 40, a data memory 42, a set of comparators 44A–44N, a control circuit 46, and a replacement circuit 50. The tags memory 40 and the data memory 42 are each coupled to receive an index portion of an address of a transaction (the address of the transaction may be referred to more briefly herein as an "input address" to the L2 cache 36). The data memory 42 is coupled to receive and provide data corresponding to the transaction. The tags memory 40 is further coupled to receive a tag portion of the input address, and is coupled to the comparators 44A–44N. The comparators 44A–44N are further coupled to receive the tag portion of the input address and are coupled to the control circuit 46. The control circuit 46 is coupled to receive control information corresponding to the transaction and is further coupled to the replacement circuit 50 and to provide a hit signal output from the L2 cache 36 (e.g. to the memory controller 14, in the illustrated embodiment). The control circuit 46 is further coupled to provide a way selection and control signals to the tags memory 40 and the data memory 42. The replacement circuit 50 is coupled to receive a portion of the input address, a transaction identifier (TID) for the transaction, and the node number from the configuration register 38.

The replacement circuit 50 selects the replacement way for a cache miss. In one embodiment, a random replacement algorithm may be used and thus the replacement circuit 50 may include a random number generator circuit which generates an indication of the replacement way. The replacement way is the way from which a cache block is evicted to provide space for the cache block corresponding to a cache miss. The control circuit 46 may cause the cache block in the replacement way to be evicted (invalidating the tag and writing the evicted cache block back to the memory 24, if dirty).

The replacement circuit 50 includes one or more registers (the way configuration, or way config., registers 48) that may be programmed to partition the L2 cache 36. For example, the partitioning may be on an agent-by-agent basis, or a remote cache block versus local cache block basis, or combinations thereof. In some embodiments, the way configuration registers 48 may further be programmable to enable certain ways for the replacement algorithm and disable others. The disabled ways may be used, e.g., as a private, low-latency random access memory (RAM). The RAM may be addressed using addresses not mapped to the memory 24, for example. In one specific embodiment, a certain portion of the address space may be defined as a direct access space. Addresses in the space directly select a cache entry in the L2 cache 36. Way enable/disable may be used in combination with the local versus remote and agent-by-agent mechanisms, in some embodiments. Additional details for one embodiment of the way configuration registers 48 and the replacement circuit 50 are provided below with regard to FIGS. 3–6.

Generally, the tags memory 40 stores the tag information for each entry in L2 cache 36, and the data memory 42 stores the cache block of data for each entry in L2 cache 36. Thus, an entry of L2 cache 36 comprises a tag memory storage location and a data memory storage location. The tag memory storage location stores the tag for the entry (and possibly other information, such as validity and dirty information). For example, in one implementation, a tag for an entry includes the tag portion of the address (e.g. bits 39:17 in the illustrated embodiment), a valid bit indicating the validity or lack of validity of the entry, and a dirty bit indicating the dirty or clean state of the cache block. A cache block is dirty if at least one byte of the cache block has been modified in L2 cache 36 and the modification has not been written to memory. The data memory storage location stores the cache block of data in the entry.

During a transaction, the index portion of the input address (e.g. bits 16:5 in the illustrated embodiment) is provided to the tags memory 40 and the data memory 42. Each memory selects a set of storage locations in response to the index. Tags memory 40 outputs the tag from each selected storage location to the comparators 44A–44N, which compare the tags to the tag portion of the input address. If the tag compares equally, and the entry is valid, the corresponding comparator 44A–44N may signal a hit to the control circuit 46. The control circuit 46 may assert the hit signal to the memory controller 14 if any of the comparators 44A–44N indicates a hit, and may determine a way selection from the output of the comparators 44A–44N as well. Each comparator 44A–44N is comparing the tag from a different way of the L2 cache 36, and thus the comparator output indicating a hit is an indication of the hitting way. The control circuit 46 provides the way selection to the tags memory 40 and the data memory 42. In the case of a miss, the control circuit 46 provides the replacement way selection to the tags memory 40 and the data memory 42 during the read used to evict the cache line.

The data memory 42 provides data from the storage location at the selected index and way, or receives data into that storage location, depending upon whether the transaction is a read or write. The control circuit 46 receives the control information corresponding to the transaction, and generates control signals for the data memory 42 and the tags memory 40. The control signals may include, for example, an enable signal and a read/write signal to indicate whether the memory is to read or write.

The tags memory 40 may be updated in response to the transaction as well. For example, if the transaction is a write, the dirty bit in the hitting entry may be updated. Additionally, if the transaction is a miss in the L2 cache 36 and is cacheable, the tags memory 40 may be updated to invalidate the evicted cache line indicated by the replacement way, as mentioned above. It is noted that tag updates and evictions may not occur in the same clock cycle that the L2 cache 36 is accessed to determine the hit/miss of the input address, in some embodiments.

It is noted that the embodiment illustrated in FIG. 2 shows various exemplary address bit ranges for a particular implementation of the L2 cache (e.g. 8 way set associative, 1 Megabyte, with 32 byte cache lines) and the size of the addresses provided on the interconnect 22. Other embodiments may vary any of these features and the bit ranges may be updated accordingly. For example, if the size of the cache is increased and the number of ways remains the same, the index bit range may be expanded (and the tag range reduced). The size of the address (40 bits in the illustrated embodiment) may be varied, affecting the bit ranges appropriately as well. Furthermore, the bit ranges may be selected differently in different implementations, according to design choice.

It is noted that, while the tags memory 40 and the data memory 42 are illustrated separately in FIG. 2, these memories may be integrated if desired. Generally, the tags memory 40 and the data memory 42 may form a memory for storing tags and corresponding cache lines of data, whether the memory is divided into portions as illustrated or is a single integrated memory.

It is noted that FIG. 2 illustrates address, data, and control signals being supplied to the L2 cache circuitry. The L2 cache 36 may include buffers or queues (not shown) to capture address and data portions of transactions. The supplied address, data, and control signals may correspond to the transaction selected by the L2 cache 36 for processing.

Figure 3:
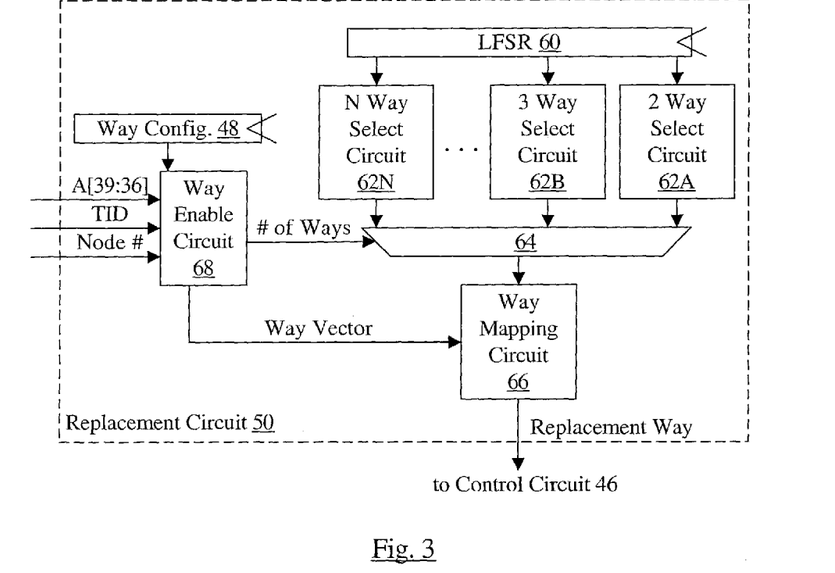
FIG. 3 is a block diagram of one embodiment of a replacement circuit shown in FIG. 2.

Turning now to FIG. 3, a block diagram of one embodiment of the replacement circuit 50 is shown. In the embodiment of FIG. 3, the replacement circuit 50 includes the way configuration registers 48, a linear feedback shift register (LFSR) 60, a set of way select circuits 62A–62N, a multiplexor (mux) 64, a way mapping circuit 66, and a way enable circuit 68. The LFSR 60 is coupled to each of the way select circuits 62A–62N, which are further coupled to the mux 64. The mux 64 is coupled to receive an indication of the number of ways enabled from the way enable circuit 68, and is coupled to the way mapping circuit 66. The way mapping circuit 68 is coupled to receive a way vector from the way enable circuit 68, and is coupled to provide an indication of the replacement way to the control circuit 46 (shown in FIG. 2). The way enable circuit 68 is coupled to the way configuration registers 48, and to receive a portion of the address (A[39:36]), the TID, and the node number.

In the illustrated embodiment, the replacement circuit 50 implements a random replacement algorithm based, at least in part, on the contents of the LFSR 60. Generally, the LFSR 60 stores a set of bits, and generates a feedback input based on some combination of the bits. The feedback input is shifted into the LFSR 60, and one of the previously stored bits is shifted out. The feedback function is designed to generate pseudo-random sequences of bit patterns in the LFSR 60.

The way select circuits 62A–62N each generate a way selection within a different number of possible ways, based on the contents of the LFSR 60. For example, 2 way select circuit 62A generates a selection of one of two ways. Similarly, 3 way select circuit 62B generates a selection of one of three ways, etc., up through N way select circuit 62N, which generates a selection of one of N ways, where N is the number of ways in the L2 cache 36. One of the way selections is selected based on the number of ways that are enabled for use for the particular transaction (that is, the number of ways in the subset of the L2 cache 36 that may be used for the particular transaction). The number of ways may be based on one or more of the initiating agent, whether the transaction is to a local or remote cache block, and/or general way enable indications. The selected way selection is provided to the way mapping circuit 66.

The way mapping circuit 66 maps the way selection to the available ways, as indicated in the way vector from the way enable circuit, to output the replacement way selection. For example, if a total of three ways are available for a transaction, the output of the 3 way select circuit 62B may be selected. In an 8 way set associative cache, if ways 1, 4, and 6 are available for the transaction, the selection from the 3 way select circuit 62B is mapped to ways 1, 4, and 6. That is, an indication of way 0 from the 3 way select circuit 62B is mapped to way 1 of the 8 ways; an indication of way 1 from the 3 way select circuit 62B is mapped to way 4 of the 8 ways; and an indication of way 2 from the 3 way select circuit 62B is mapped to way 6 of the 8 ways for this example.

In one embodiment, each of the way select circuits 62A–62N outputs a one hot vector, with each bit corresponding to one of the ways that the way select circuit 62A–62N is configured to select (i.e. the 2 way select circuit 62A outputs a two-bit one-hot vector; the 3 way select circuit 62B outputs a three-bit one-hot vector; etc.). The set bit in the one hot vector indicates the selected way. The way mapping circuit 66 stretches and shifts the selected one hot vector to N bits, mapping each bit of the one hot vector to an enabled way indicated in the way vector. The resulting N-bit one-hot vector indicates the selected way. Other embodiments may encode the way selections or use any other representation of the way selection.

It is noted that way select circuits which are not a power of 2 may employ other sources of data for generating a way selection, in addition to the LFSR 60. Way select circuits which are a power of 2 may directly generate a way selection from the LFSR 60 by logically combining bits in the LFSR 60. Way select circuits which are not a power of 2 may generate a way selection for the next higher power of two, and may distribute unused way selections over the possible ways in some manner. For example, a counter may be used which counts from zero to the number of possible ways, and the counter output may be selected if the way selection based on the next higher power of two is not one of the possible ways. For example, a 6 way select circuit may generate an 8 way selection (e.g. one of ways 0 to 7) based on the contents of the LFSR 60. Ways 0 to 5 of the 8 way selection may be directly mapped to one of the 6 ways. Ways 6 and 7 of the 8 way selection, when generated, may be replaced by the value from a counter that counts from 0 to 5 (and the counter may be incremented). The counter may be represented in any fashion (e.g. encodings from 0 to 5, a 6-bit one-hot vector in which an increment is implemented as a rotation of the one hot vector, etc.).

It is noted that the way select circuits 62A–62N, the mux 64, and the way mapping circuit 66 are merely one implementation of circuitry to generate the way selection. Other embodiments may be implemented. Generally, the circuitry may receive at least an indication of the ways which may be selected as the replacement way for a given transaction (e.g.

the way vector), and may select one of the eligible ways. While a random replacement algorithm is used in the illustrated embodiment, other embodiments may use other algorithms (e.g. first-in, first-out (FIFO), least recently used (LRU) or hybrids thereof, etc.).

Figure 4:
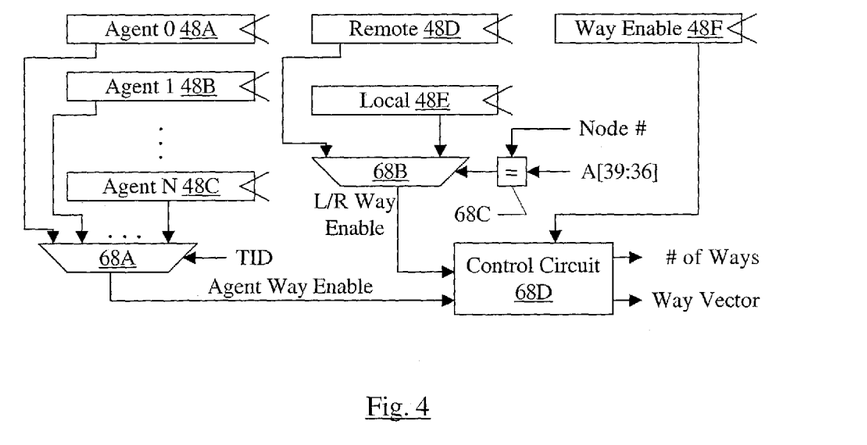
FIG. 4 is a block diagram illustrating a portion of the replacement circuit in greater detail.

The way enable circuit 68 is configured to generate the way vector (and the number of ways, in the illustrated embodiment) responsive to the contents of the way configuration registers 48 and the other inputs to the replacement circuit 50 shown in FIG. 3. An example illustrating one embodiment of the way enable circuit 68 and the way configuration registers 48 is shown in more detail in FIG. 4. In particular, FIG. 4 illustrates a number of way configuration registers 48, including agent way enable registers 48A–48C, a remote way enable register 48D, a local way enable register 48E, and a way enable register 48F. The way enable circuit 68 may include muxes 68A–68B, a comparator 68C, and a control circuit 68D. The agent way enable registers 48A–48C are coupled to the mux 68A, which is coupled to receive the TID as a selection control. The output of the mux 68A (Agent Way enable) is supplied to the control circuit 68D. The remote way enable register 48D and the local way enable register 48E are coupled to the mux 68B, which receives a selection control from the comparator 68C. The comparator 68C is coupled to receive the most significant bits of the address of the transaction (A[39:36]) and the node number from the configuration register 38. The way enable register 48F is coupled to the control circuit 68D, which generates the number of ways and the way vector output of the way enable circuit 68.

The way configuration registers may comprise an agent way enable register 48A–48C for each agent on the interconnect 22 that may initiate a transaction. The agent way enable register 48A–48C that corresponds to a given agent stores a way enable indication. The way enable indication indicates which ways are enabled for selection in response to a cache miss for a transaction initiated by the given agent. That is, the way enable indication identifies the subset of ways that may be selected for replacement in response to the cache miss. For example, in one embodiment, a vector of bits may be stored (one bit for each way). If the bit is set, the corresponding way is enabled for selection for that agent. If the bit is clear, the corresponding way is not enabled for selection for that agent. Other embodiments may employ the opposite meanings for the set and clear states of the bits, or any other indication.

Each transaction on the interconnect 22 may include a TID that identifies the initiating agent (and may also include a sequence number that identifies the transaction among a plurality of transactions that may be outstanding from the initiating agent). The portion of the TID that identifies the agent may be used by the mux 68A to select the way enable indication from the agent way enable register 48A–48C that corresponds to the initiating agent. The TID may be used directly as a selection control, or a logic circuit may be included to decode the TID to generate the selection control.

The remote way enable register 48D may store a way enable indication indicative of which ways are enabled for remote cache blocks (that is, which ways are in the subset of ways that may be selected for replacement in response to a miss for a remote cache block). Similarly, the local way enable register 48E may store a way indication of which ways are enabled for local cache blocks. Similar to the agent way enable registers, in one embodiment, the remote way enable registers 48D and the local way enable register 48E may each store a vector of bits (one bit for each way).

In the illustrated embodiment, the mux 68B selects the way enable indication from either the remote way enable register 48D or the local way enable register 48E responsive to the output of the comparator 68C. That is, the comparator 68C may determine if the transaction is to a local cache block or a remote cache block for this embodiment. In this embodiment, a cache block may be local if the most significant bits of the address match the node number for the node 10. That is, the address space implemented by a plurality of nodes including the node 10 may be mapped to each node using the most significant bits of the addresses. Additionally, in some embodiments, the cache block may be local if the most significant bits of the address are zero. The comparator 68C may detect these two conditions and may select the way enable indication from the local way enable register 48E. Otherwise, the way enable indication from the remote way enable register 48D may be selected. Other embodiments may identify local versus remote cache blocks in other ways, and other circuitry may be used to select one of the local way enable register 48E or the remote way enable register 48D in response. The selected way enable is supplied by the mux 68B to the control circuit 68D as the local/remote (L/R) way enable.

The control circuit 68D may combine the agent way enable indication, the L/R way enable indication, and the way enable indication from way enable register 48F to generate the number of ways enabled and the way vector. The combined way enable indication may indicate that a given way is enabled if that given way is enabled in each of the input way enable indications. Generally, the combination may be performed in a variety of fashions, based on the form of the way enable indications. For example, if the way enable indications are bit vectors (with a set bit indicating that the way is enabled), the control circuit 68D may bitwise AND the vectors to generate the way vector (and may count the set bits to generate the number of ways). If the way enable indications are bit vectors with a clear bit indicating that a way is enabled, the control circuit 68D may bitwise OR the vectors.

In some cases, the combining of the agent way enable indication, the L/R way enable indication, and the way enable indication from the way enable register 48F may result in a combined indication that no ways are enabled (e.g. a logical AND may result in a zero way vector). In some embodiments, such a result may be considered a programming error. The control circuit 68D may implement a default selection in such cases. For example, the control circuit 68D may randomly select any way or may select a predetermined way. The control circuit 68D may rotate through selecting each way for consecutive cases of the combined indication indicating that no ways are enabled. In one particular embodiment, the control circuit 68D may apply a priority scheme to the input way enable indications. For example, the way enable indication from way enable register 48F may be given highest priority, the L/R way enable indication may be given next highest priority, and the agent way enable indication may be given lowest priority. Thus, if the combination of the three way enable indications leads to no ways being enabled, the control circuit 68D may combine the L/R way enable indication and the way enable indication from the way enable register 48F. If the combination of the L/R way enable indication and the way enable indication from the way enable register 48F leads to no ways being enabled, only the way enable indication from the way enable register 48F may be used. Other embodiments may set the priorities of the way enable indications differently, as desired.

By programming the way configuration registers 48 in various fashions, any combination of the way enabling features may be used. For example, only local versus remote way enabling may be used by programming the agent way enable registers 48A–48C and the way enable register 48F to indicate all ways enabled. Similarly, only the way enable register 48F or the agent way enabling may be used by programming the other way enable registers to indicate all ways enabled. Other embodiments are contemplated in which only the local versus remote way enabling is implemented, only the agent way enabling is implemented, or any combination of the way enabling mechanisms illustrated in FIG. 4 may be implemented. In one embodiment, the way configuration registers 48 are initially set to all ways enabled in response to reset of the node 10.

The way configuration registers 48 may be read and written by software (e.g. instructions executing on the processors 12A–12N) in any desired fashion. For example, special instructions may be used to read and write the registers. Alternatively, a portion of the address space of the node 10 may be used to read and write the way configuration registers 48 (and other configuration registers in the node 10) using load/store instructions.

It is noted that, in other embodiments, a remote/local way enable register may be employed in place of the local way enable register 48E and the remote way enable register 48D. The remote/local way enable register may define which ways are enabled for remote cache blocks and which ways are enabled for local cache blocks. For example, a vector of bits (one for each way) may be implemented. One state of each bit (set or clear) may indicate that the way is enabled for remote cache blocks and the other state of each bit may indicate that the way is enabled for local cache blocks. The vector of bits may be bitwise inverted to generate the vector for one of the cache block types, and may be used unmodified as the vector for the other cache block type. Alternatively, an encoded way value may be used to divide the cache into two sections, one partition for remote cache blocks and the other partition for local cache blocks. In still other embodiments, way enable indication may be set for local and global cache blocks on an agent-by-agent basis, if desired, using a set of remote and local way enable registers for each agent.

It is noted that each way enable register 48A–48F may be implemented as multiple registers, where the multiple registers may be readable and writeable independently by software, as desired. As used herein, the term "register" refers to any clocked storage device. For example, a register may be a flip-flop (or "flop"), a latch, a series of latches, a clocked random access memory (RAM) cell, or any other desirable storage.

Figure 5:
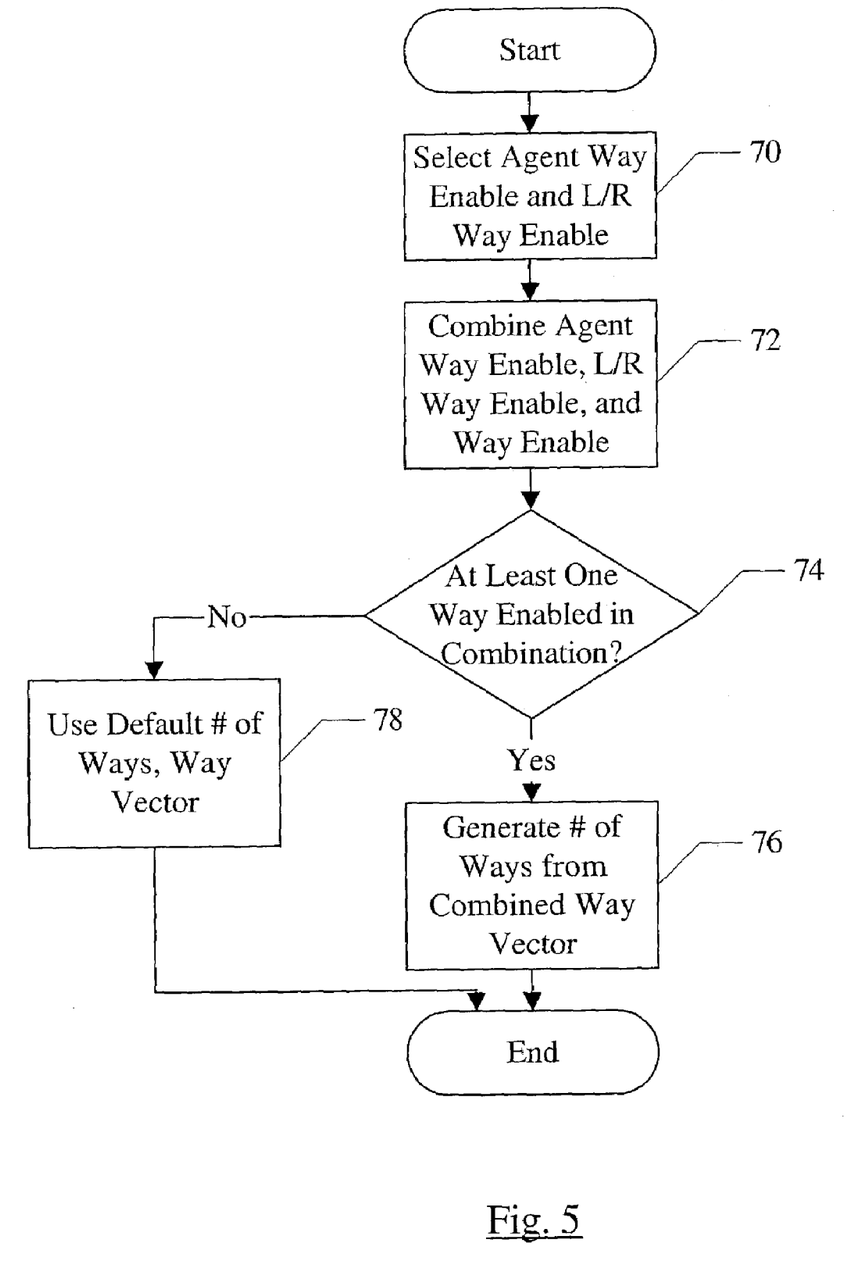
FIG. 5 is a flowchart illustrating operation of one embodiment of a control circuit shown in FIG. 4.

Turning next to FIG. 5, a flowchart is shown illustrating operation of one embodiment of the way enable circuit 68. While the blocks shown in FIG. 5 are illustrated in a particular order for ease of understanding, any order may be used. Furthermore, blocks may be performed in parallel by combinatorial logic circuitry in the way enable circuit 68.

The way enable circuit 68 may select the agent way enable indication and the L/R way enable indication responsive to the TID and whether or not the transaction is to a local cache block or a remote cache block, respectively (block 70). The way enable circuit 68 may combine the agent way enable indication, the L/R way enable indication, and the way enable indication from the way enable register 48F (block 72). If the combined indications have at least one way enabled (decision block 74, "yes" leg), the way enable circuit 68 may generate the number of ways from the combined way vector (which is transmitted as the way vector by the way enable circuit 68) (block 76). On the other hand, if the combined indications have no ways enabled (decision block 74, "no" leg), the way enable circuit 68 may use a default number of ways and way vector (block 78).

Figure 6:
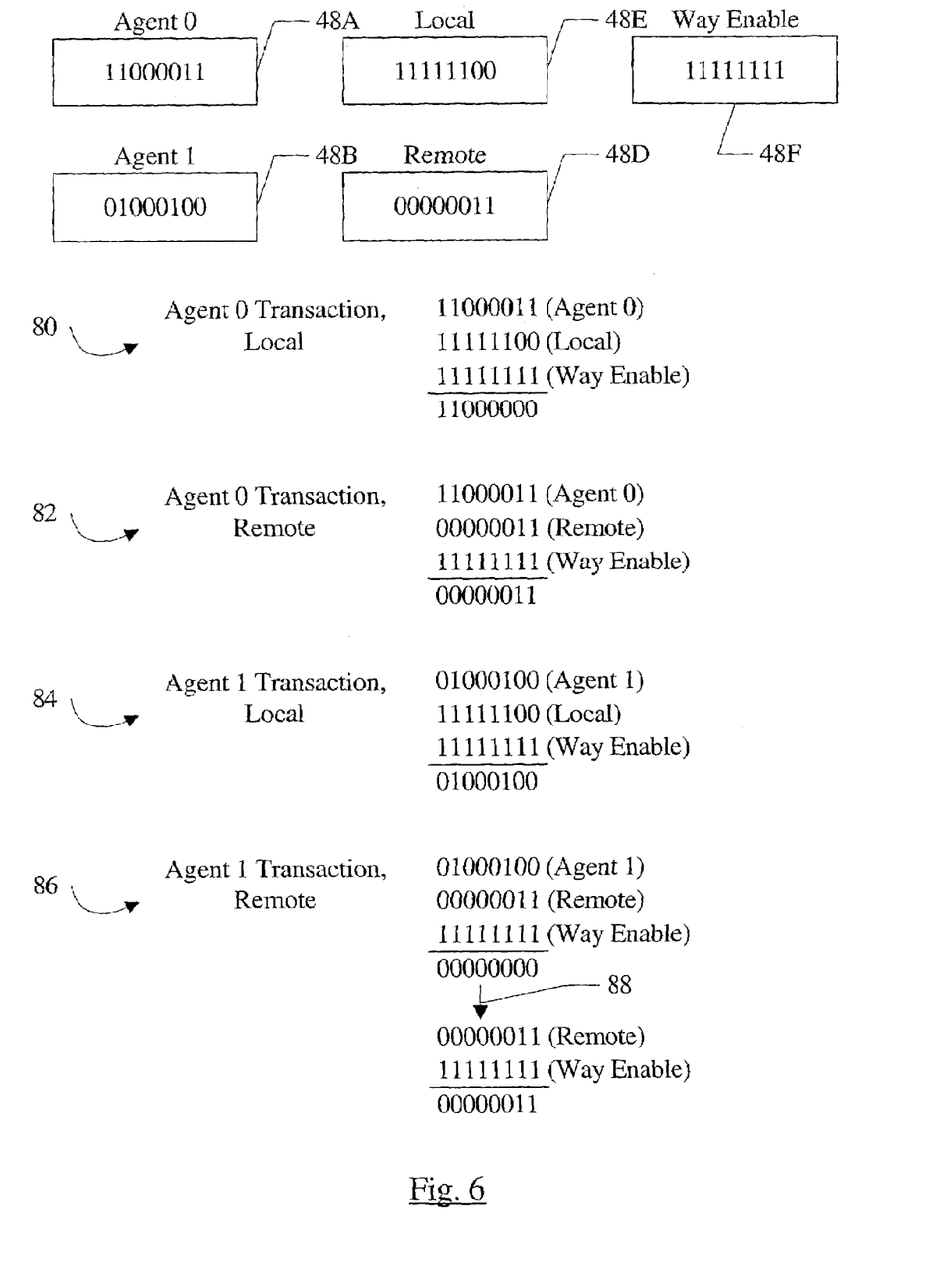
FIG. 6 is a block diagram illustrating several examples of replacement selection.

Turning next to FIG. 6, an example of the use of the way configuration registers 48 for two exemplary agents is shown. In this example, an 8 way set associative cache is used and all ways are enabled in the way enable register 48F. The local and remote way enable registers 48E and 48F are shown with exemplary way enable indications, as well as agent 0 way enable register 48A and agent 1 way enable register 48B. For the example of FIG. 6, the bit on the left of each way enable indication may correspond to way 0, and then each way in turn may be represented by consecutive bits until the right-most bit is encountered, corresponding to way 7. Thus, agent 0 is enabled for ways 0, 1, 6, and 7 in this example. Similarly, agent 1 is enabled for ways 1 and 5. Local cache blocks are enabled for ways 0 through 5, and remote cache blocks are enabled for ways 6 and 7.

Below the way configuration registers 48 are examples for different transactions. First, a local transaction initiated by agent 0 is shown (reference numeral 80). Thus, the agent 0 way enable indication, the local way enable indication, and the way enable indication from the register 48F are combined. The resulting way enable vector indicates that ways 0 and 1 may be used if the transaction misses in the L2 cache 36. On the other hand, for a remote transaction initiated by agent 0 (reference numeral 82 in FIG. 6), ways 6 and 7 are indicated as selectable by combining the agent 0 way enable indication, the remote way enable indication, and the way enable indication from the way enable register 48F. In either case, one of the two indicated ways may be randomly selected for replacement.

If agent 1 initiates a local transaction (reference numeral 84), the agent 1 way enable indication are used and thus ways 1 and 5 are indicated as selectable. However, if agent 1 initiates a remote transaction (reference numeral 86), none of the ways are indicated as selectable. In this case, the L2 cache 36 resorts to the priority mechanism (arrow 88), and the combination of the remote way enable indication and the way enable indication from the way enable register 48F results in ways 6 and 7 being indicated as selectable.

Computer Accessible Medium

Figure 7:
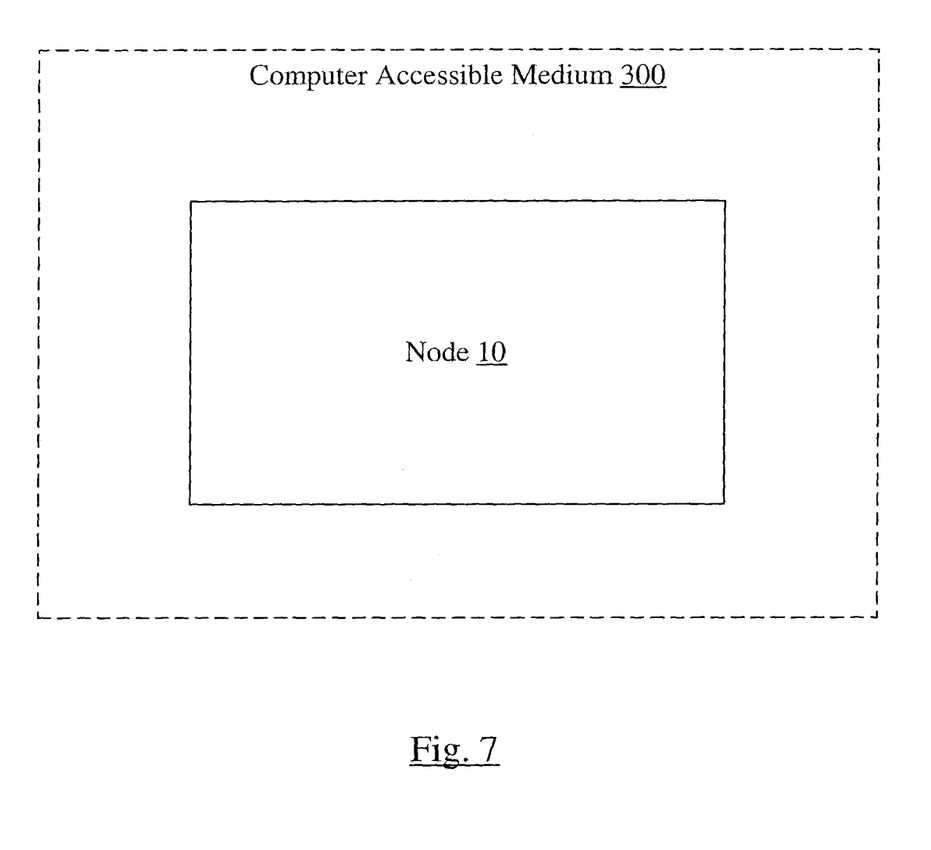
FIG. 7 is a block diagram of a computer accessible medium.

Turning next to FIG. 7, a block diagram of a computer accessible medium 300 including one or more data structures representative of the circuitry included in the node 10 is shown. Generally speaking, a computer accessible medium may include storage media such as magnetic or optical media, e.g., disk, CD-ROM, or DVD-ROM, volatile or non-volatile memory media such as RAM (e.g. SDRAM, RDRAM, SRAM, etc.), ROM, etc., as well as media accessible via transmission media or signals such as electrical, electromagnetic, or digital signals, conveyed via a communication medium such as a network and/or a wireless link.

Generally, the data structure(s) of the circuitry on the computer accessible medium 300 may be read by a program and used, directly or indirectly, to fabricate the hardware comprising the circuitry. For example, the data structure(s) may include one or more behavioral-level descriptions or register-transfer level (RTL) descriptions of the hardware functionality in a high level design language (HDL) such as Verilog or VHDL. The description(s) may be read by a synthesis tool which may synthesize the description to produce one or more netlist(s) comprising lists of gates from a synthesis library. The netlist(s) comprise a set of gates which also represent the functionality of the hardware comprising the circuitry. The netlist(s) may then be placed and routed to produce one or more data set(s) describing geometric shapes to be applied to masks. The masks may then be used in various semiconductor fabrication steps to produce a semiconductor circuit or circuits corresponding to the circuitry. Alternatively, the data structure(s) on computer accessible medium 300 may be the netlist(s) (with or without the synthesis library) or the data set(s), as desired. In yet another alternative, the data structures may comprise the output of a schematic program, or netlist(s) or data set(s) derived therefrom.

While computer accessible medium 300 includes a representation of the node 10, other embodiments may include a representation of any portion of the node 10 (e.g. processors 12A–12N, memory controller 14, L2 cache 36, interconnect 22, memory bridge 32 (or portions thereof), remote line directory 34, switch 18, interface circuits 22A–22C (or portions thereof), etc.).

Numerous variations and modifications will become apparent to those skilled in the art once the above disclosure is fully appreciated. It is intended that the following claims be interpreted to embrace all such variations and modifications.

What is claimed is:

1. A cache comprising:
   a memory including a plurality of entries, wherein each entry of the plurality of entries is configured to store a cache block; and
   a circuit having one or more first registers programmable to indicate a first subset of entries selectable for a first agent to store a first cache block corresponding to a first transaction initiated by the first agent and a second subset of entries selectable for a second agent to store a second cache block corresponding to a second transaction initiated by the second agent, the circuit also including one or more second registers programmable to indicate a third subset of the plurality of entries selectable to store local cache blocks and a fourth subset of the plurality of entries selectable to store remote cache blocks, and the circuit to combine indications of the first subset and the third subset to select the first entry for the first transaction if the first transaction is to a local cache block and to combine indications of the first subset and the fourth subset to select the first entry for the first transaction if the first transaction is to a remote cache block.

2. The cache as recited in claim 1 wherein the first subset and the second subset overlap.

3. The cache as recited in claim 1 wherein the one or more first registers are programmable to identify subsets of the plurality of entries for each of a plurality of agents that are configured to initiate transactions.

4. The cache as recited in claim 1 wherein, if a combination of the indications results in no entries of the plurality of entries being identified, the circuit is configured to use a default selection.

5. The cache as recited in claim 4 wherein the default selection includes prioritizing the third or fourth subset over the first subset.

6. The cache as recited in claim 5 further comprising one or more third registers programmable to indicate a fifth subset of the plurality of entries that are enabled for use, wherein the circuit is configured to combine indications of the fifth subset, the first subset, and the third or fourth subset to select the first entry, and wherein the default selection includes prioritizing the fifth subset over the third or fourth subset.

7. A method comprising:
   receiving a first transaction in a cache; and
   selecting a first entry of a plurality of entries in the cache to store a first cache block corresponding to the first transaction, wherein the first entry is selected from a first subset of the plurality of entries indicated as selectable for a first agent that initiated the transaction;
   selecting a second entry of the plurality of entries to store a second cache block corresponding to a second transaction initiated by a second agent, wherein the second entry is selected from a second subset of the plurality of entries indicated as selectable for the second agent; and
   combining a first indication of the first subset and a second indication of a third subset of the plurality of entries, the third subset useable to store local cache blocks, wherein the first entry is in both the first subset and the third subset if the first cache block is a local cache block.

8. The method as recited in claim 7 wherein the first subset and the second subset overlap.

9. The method as recited in claim 7 further comprising combining a first indication of the first subset and a third indication of a fourth subset of the plurality of entries, the fourth subset useable to store remote cache blocks, wherein the first entry is in both the first subset and the fourth subset if the first cache block is a remote cache block.

* * * * *